Nov. 29, 1966     C. A. VOGEL     3,287,809
DRAFTING INSTRUMENT
Filed Aug. 5, 1964     2 Sheets-Sheet 2
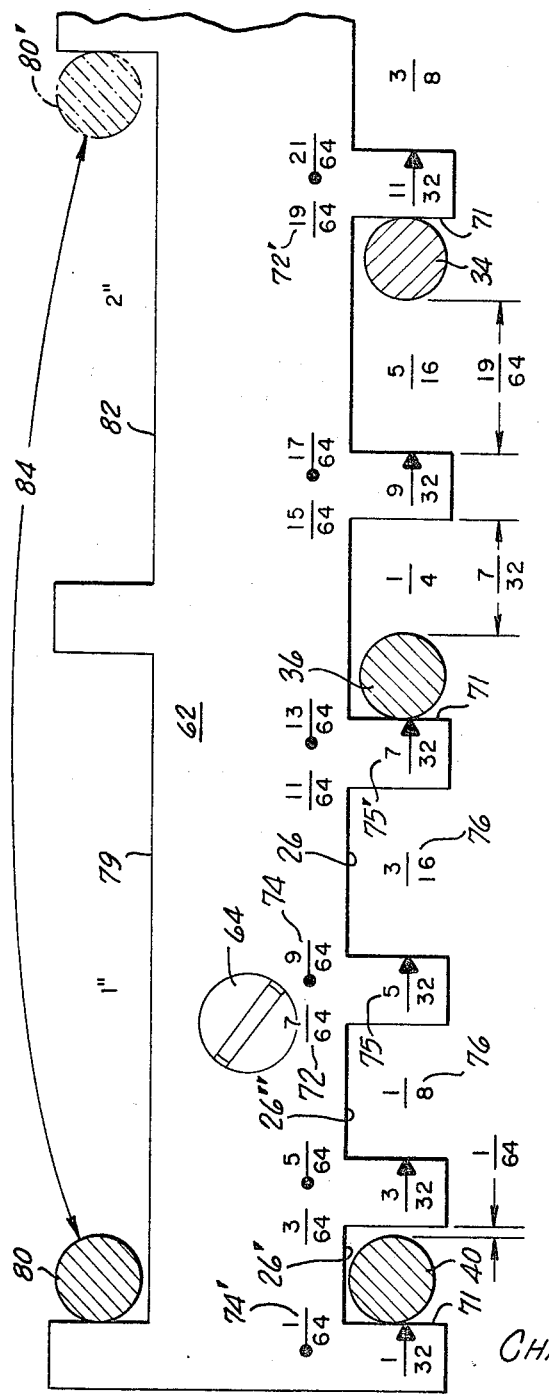
CHARLES A. VOGEL
INVENTOR.
BY James H. Griffin
ATTORNEY

United States Patent Office

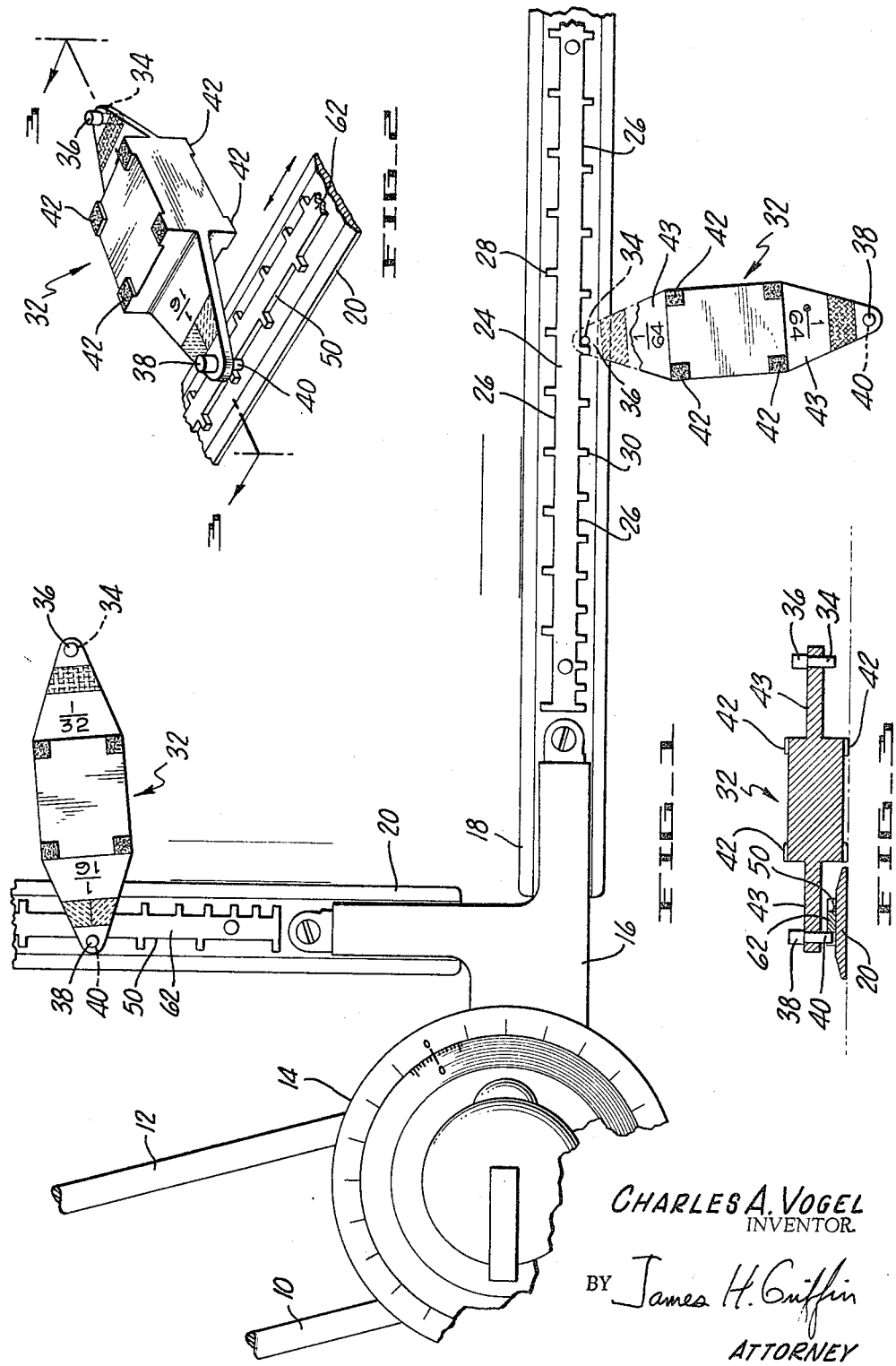

3,287,809
Patented Nov. 29, 1966

3,287,809
DRAFTING INSTRUMENT
Charles A. Vogel, Sunnyvale, Calif., assignor to Ampex Corporation, Redwood City, Calif., a corporation of California
Filed Aug. 5, 1964, Ser. No. 387,668
1 Claim. (Cl. 33—81)

This application relates to drafting equipment and more particularly to means for aiding and speeding up the dimensioning of drawings.

Applicant's novel dimensioning aid will be described as an attachment or mounting for a conventional drafting machine, but it is to be understood that the invention may be applied in many other ways, including use as an independent attachment on a drafting machine or the use as a separate drafting instrument. As is well known, the usual drafting practice in measuring dimensions is to measure each dimension visually with a drafting scale. This scale is applied with one of its calibration marks on a previously drawn dimension line or other reference point, then the calibration mark on the scale representing the new dimension is located visually (or extrapolation between calibration marks is performed if the scale calibrated for the dimension desired), then a pencilled dot is marked next to the newly-located calibration mark, and finally a straight edge of the drafting machine is positioned and a short vertical dimension line is drawn through the dot. This operation must be repeated in full for each separate dimension desired.

From the above description, several obvious sources of drafting inaccuracy are apparent: in applying the drafting scale to the previously drawn dimension line, in lining up the pencil with the newly located calibration mark, in extrapolating, if that is necessary, and in lining up the straight edge of the drafting machine with the pencilled dot. As the increments become smaller (1/32"–1/64"), the percentage error becomes quite large. Moreover, the above described method of dimensioning is time consuming and does not lend itself to time saving through volume production.

In the past, various substitutes for the usual drafting scale method of dimensioning have been attempted, as for example, the use of a template having pencilling holes various distances apart. Such a template is, if anything, more inaccurate than the scale, unless the pencilling holes have calibration marks associated therewith so that visual line-up of the pencil and the exact calibration point is possible. The template does, however, provide some time saving because each standard dimension is already measured off and usually is labelled, so that a draftsman does not have to occupy himself anew with each dimension to be drawn with counting off the calibration marks until the desired dimension is located.

The general object of this invention is to provide improved dimensioning equipment for use in drafting.

Another object of this invention is to provide dimensioning equipment which facilitates greater accuracy in laying out dimensions.

Another object of this invention is to provide dimensioning equipment requires less effort and eyestrain on the part of the draftsman.

Another object of this invention is to provide dimensioning equipment which facilitates the shortening of the time required to lay out dimensions especially when a number of dimensions are being laid out at the same time.

In the achievement of the above objects and as a feature of applicant's invention a scale having abutment means and movable detecting means such that movement of the scale until the abutment means comes to rest against said detenting means will serve to measure off a certain dimension. In a preferred practice of this principle there is provided a notched scale which may be attached to the standard scale of the drafting machine or may be incorporated as an integral part of a scale or used independently. Each notch represents a particular dimension that it may be desired to lay off on a drawing and has a length in the longitudinal direction of the scale that is greater than the corresponding dimension by the diameter of the pin. A separate weighted base is provided from which a pin extends to fit into the notches on the scale. The base can be moved by hand and positioned so that the pin provides a reference point for laying off the dimensions on the drawing. The scale is then moved longitudinally as far as it can go with the slot sliding in relation to the pin, and the distance the scale is actually moved is equal to the length of the slot less the diameter of the pin. The weighted base may have a number of pins of different diameters, so that with each notch a corresponding variety of dimensions can be laid off. Each notch represents one basic dimension; the total array of notches may be arranged to provide dimensions and increments between zero and any desired number of inches.

The notch scale and movable base combine to provide a means of moving a drafting machine straight edge by far more accurate increments than were possible using the prior "visual" method of pointing out dimensions from a calibrated scale. Moreover, after gaining a little experience in using them, a draftsman can lay off a plurality of dimensions quicker with a movable base and notch scale than he could by pencilling from a point on a calibrated scale.

Other objects and features of this invention and a fuller understanding thereof may be had by referring to the following description and claims taken in conjunction with the accompanying drawings, in which:

FIGURE 1 is a plan view of a conventional drafting machine to which applicant's novel notch scale and movable base combination have been attached;

FIGURE 2 is a perspective view of a movable base operatively associated with a notch scale;

FIGURE 3 is a cut-away view and side elevation of the movable base shown perspectively in FIGURE 2, the cutaway being made along the lines 3—3; and FIGURE 4 is a detail plan view of a portion of a notch scale according to applicant's invention, with pins from the movable base cooperating therewith.

Referring to FIGURE 1, the conventional drafting machine shown there for purposes of illustration has parallel arms 10 and 12, an indexing head assembly 14, and a scale base 16. A conventional horizontal scale 18 and a conventional vertical scale 20 are mounted at right angles to each other on the scale base 16. As is customary with present drafting machines, the parallel arms 10 and 12, the indexing head assembly 14, and the scale base 16 cooperate to maintain the horizontal scale 18 and the vertical scale 20 in unchanging alignment relative to a drafting board 22 upon which they rest, regardless of their movement over the surface thereof.

According to one embodiment of applicant's invention, there is affixed to the horizontal scale 18 a notched scale 24 having notches 26 at varying intervals along both scaling edges 28 and 30. Cooperating therewith is a preferred embodiment of the movable base which is a feature of applicant's invention, here shown generally at 32. The preferred movable base 32 here shown has four pins, 34, 36, 38, and 40, each of which has a different diameter. In practice, the movable base 32 rests on legs 42 which preferably are composed of or coated with some material that retards slippage on the drafting board 22. Each of the pins 34, 36, 38, and 40 of the movable base 32 may be labelled with a numeral as shown at 43, 44, and 45, or a letter or other mark, or a color marking.

In the practice of applicant's invention, a notched scale 50 similar to the notched scale 24 attached to the horizontal scale 18 is mounted on the vertical scale 20 of the drafting machine shown in FIGURE 1. Ordinarily, the same movable base 32 or another movable base identical thereto would be used with the vertical notched scale 50.

Referring to FIGURE 4, a portion of applicant's novel notched scale is shown with a screw 64 for attaching it to a conventional scale (not shown). Various sized pins are shown at 34, 36, and 40 in position against notch edges 71. Four different sets of labels 72, 74, 75, and 76 are shown associated with each notch 26. Each label gives a practical dimension (decimal or metric system increments are equally feasible) that the notch will serve to measure off in cooperation with one certain correspondingly labelled pin on the movable base 32. For example: the $1/64$ label 74' corresponds to the $1/64$ pin 40 on the movable base 32 and indicates that with that pin 40 the associated notch will dimension off $1/64$ inch. On the other hand, the $7/32$ label 75' with an arrow pointing to one edge 71 indicates that the notch in cooperation with the $1/32$ pin 36 on the movable base 32 will dimension off $7/32$ inch. In like manner, the $19/64$ dimension 72' in association with an edge 71 indicates that the corresponding notch when cooperating with the $1/64$ pin 34 will dimension of $19/64$ inch.

In a model made according to the above description, the diameters of the four pins of the movable base 32 were $1/8$ ($8/64$, $5/32$) $10/64$ and $11/64$. In order to facilitate the dimension of every fractional increment from $1/64$ on up, the first notch 26' was made $3/16$ ($12/64$ inch in length) with the $11/64$ inch pin, $1/64$ inch would be dimensioned with the $5/32$ ($10/64$), $1/32$ ($2/64$) with the $9/64$, $3/64$ with the $1/8$ ($8/64$), $1/16$ ($4/64$) by increasing the length of succeeding notches by increments of $1/16$ inch, the rest of the fractional scales were similarly obtained. For example: the second notch 26" was $1/4$ ($4/16$ inch long).

The top scale is arranged in a different manner and for a different purpose: the notches there are all the same length, save for the first notch 79 where the pin 80 originally starts out in each dimensioning operation using the top scale. The first notch 79 is of such a length that in cooperation with a selected pin 80 on the movable base 32 it will dimension out one inch. Succeeding notches 82 are such lengths (usually equal) that when the scale is moved so that the stationary pin 80 traverses the path 84 relative to the scale and arrives at a position 80' dimensions of two, three, or more inches will be laid out.

In the use of the above described notched scales 24 and 50 (as mounted on a conventional drafting machine) and of the movable base 32 in cooperation therewith, one of the pins 34, 36, 38, or 40 is inserted into the notch and is held stationary to the drawing board, while the corresponding scale 18 or 20 is moved until the opposite end of the notch comes against the pin. This will result in the laying out of the distance equal to the length of the notch less the diameter of the pin. Because the diameters of the pins subtract from the length of the notch to give the effective travel of the notched scale, it is possible by using pins four different diameters to dimension by any of the common fractions of an inch all the way down to $1/64$ or farther. Also, part of the scale may be constructed such the movement along a stationary pin for a number of notches will permit full inch dimensioning, up to twelve or more one inch increments, depending on the length of the notched scale.

In doing layout work with the above-described notched scale and movable base, six or more dimensions can be obtained consecutively without referring back to the reference line before cumulative error becomes objectionable. For ordinary drawing work, return to the reference line for this purpose has not been found necessary.

Although the invention has been described in its preferred form with a certain degree of particularity, it is to be understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A drafting machine comprising: two parallel bars, an indexing head mounted on the parallel bars, a scale base mounted on the indexing head, a horizontal scale mounted on the scale base, a vertical scale mounted on the scale base at a right angle to the horizontal scale, a horizontal notched scale mounted on the horizontal scale, a vertical notched scale mounted on the vertical scale, both said notched scales having notches on both upper and lower straight edges, the notches on said straight edges having lengths of varying increments, a movable base for cooperative use with said notched scales, legs on said movable base for resting upon a drawing board, slip retarding material on said legs for preventing slippage of said movable base on said drawing board, and four pins on said movable base, each of said pins having a different diameter such that the movement of a properly selected notch on one of said notched scales for its full length while a properly selected pin of the movable base is held stationary therein serves to move the corresponding scale a certain desired dimensional distance.

References Cited by the Examiner

UNITED STATES PATENTS

| | | | |
|---|---|---|---|
| 1,081,161 | 12/1913 | Silverston | 33—110 |
| 1,090,064 | 3/1914 | Howard | 33—81 X |
| 1,712,106 | 5/1929 | Elam | 33—110 |
| 2,080,792 | 5/1937 | Simmons | 33—110 |

FOREIGN PATENTS

| | | |
|---|---|---|
| 442,973 | 7/1912 | France. |
| 628,144 | 8/1949 | Great Britain. |

LEONARD FORMAN, *Primary Examiner.*

ISAAC LISANN, *Examiner.*

HARRY N. HAROIAN, *Assistant Examiner.*